US012730691B2

(12) United States Patent
Teekaramsingh et al.

(10) Patent No.: US 12,730,691 B2
(45) Date of Patent: Sep. 8, 2026

(54) PROACTIVE MONITORING OF FILE STATUS UPDATES IN TRANSACTION SYSTEMS

(71) Applicant: Truist Bank, Charlotte, NC (US)

(72) Inventors: Omganesh Teekaramsingh, Johns Creek, GA (US); Louis Allin, Richmond, CA (US); Jonathan Topp, Montpelier, VA (US); Sreelekshmi Padmakumar, Richmond, VA (US)

(73) Assignee: Truist Bank, Charlotte, NC (US)

( * ) Notice: Subject to any disclaimer, the term of this patent is extended or adjusted under 35 U.S.C. 154(b) by 722 days.

(21) Appl. No.: 18/061,531

(22) Filed: Dec. 5, 2022

(65) Prior Publication Data

US 2024/0184643 A1 Jun. 6, 2024

(51) Int. Cl.
*G06F 9/54* (2006.01)
*G06F 16/11* (2019.01)

(52) U.S. Cl.
CPC ............ *G06F 9/542* (2013.01); *G06F 16/122* (2019.01)

(58) Field of Classification Search
CPC .... G06F 9/542; G06F 16/122; G06F 16/2358; G06Q 20/027; G06Q 20/042; G06Q 40/02
See application file for complete search history.

(56) References Cited

U.S. PATENT DOCUMENTS

2010/0161466 A1* 6/2010 Gilder .................... G06Q 40/12 705/40
2014/0040141 A1* 2/2014 Gauvin ............. G06V 30/1448 705/45
2014/0304149 A1* 10/2014 Hockridge ............ G06Q 20/10 705/39
2018/0189870 A1* 7/2018 Weinflash ............. G06Q 40/12
2020/0320199 A1* 10/2020 Sheth .................... H04L 63/123
2020/0320485 A1* 10/2020 Springhetti ........ G06Q 20/0425

* cited by examiner

*Primary Examiner* — Peng Ke
(74) *Attorney, Agent, or Firm* — Kilpatrick Townsend & Stockton LLP; Michael A. Springs, Esq.

(57) ABSTRACT

File status updates can be proactively monitored in transaction systems. For example, a system can send an X9 file comprising transaction data associated with a plurality of transactions to a downstream transaction processing system. The system can receive, via an X9 file status application programming interface (API), a message indicating a status of the X9 file. The X9 file status API can be configured to receive the message from a listener system monitoring for X9 file status updates. The system can cause an action based on the status of the X9 file.

15 Claims, 3 Drawing Sheets

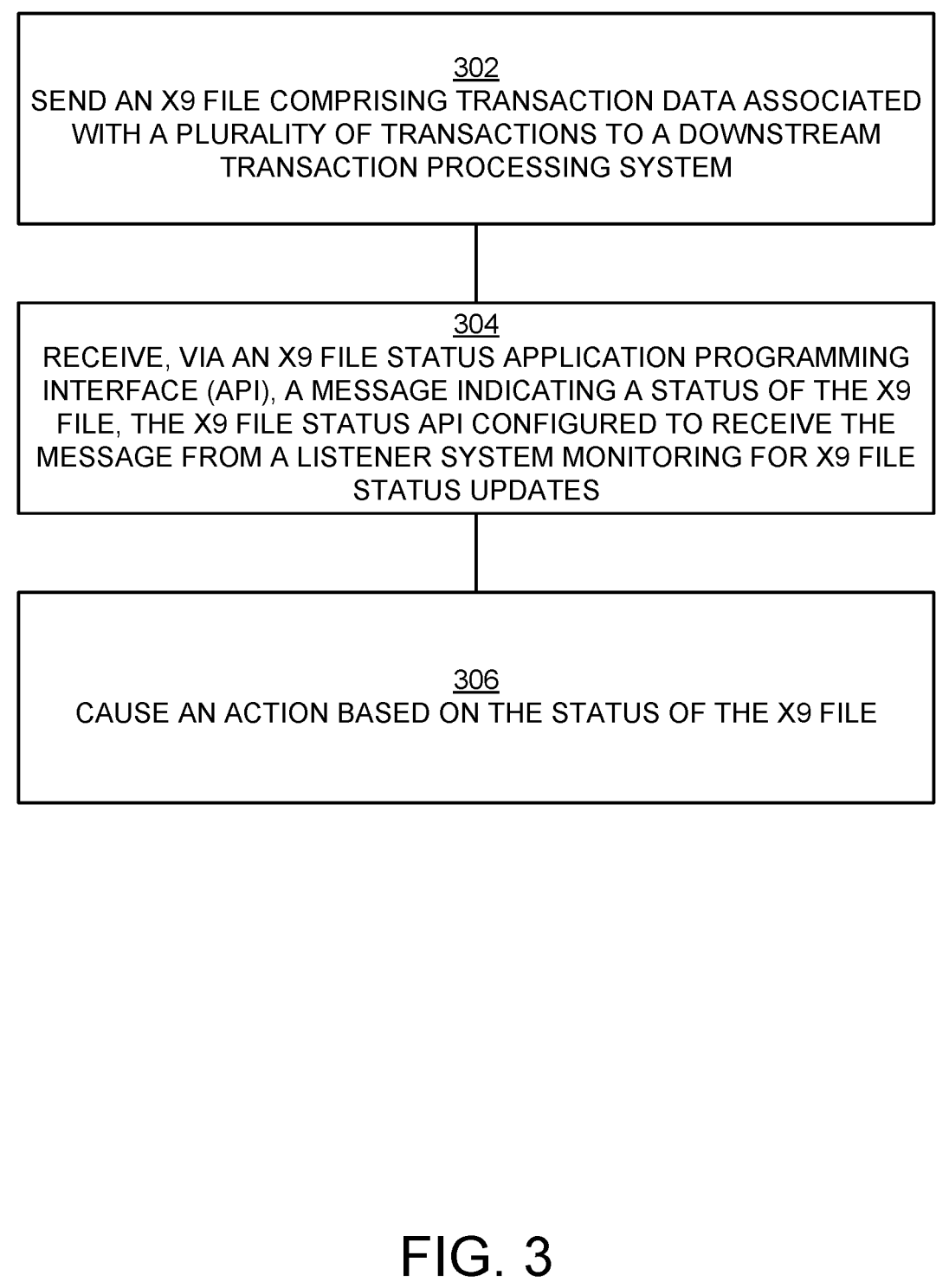

302
SEND AN X9 FILE COMPRISING TRANSACTION DATA ASSOCIATED WITH A PLURALITY OF TRANSACTIONS TO A DOWNSTREAM TRANSACTION PROCESSING SYSTEM

304
RECEIVE, VIA AN X9 FILE STATUS APPLICATION PROGRAMMING INTERFACE (API), A MESSAGE INDICATING A STATUS OF THE X9 FILE, THE X9 FILE STATUS API CONFIGURED TO RECEIVE THE MESSAGE FROM A LISTENER SYSTEM MONITORING FOR X9 FILE STATUS UPDATES

306
CAUSE AN ACTION BASED ON THE STATUS OF THE X9 FILE

FIG. 3

PROACTIVE MONITORING OF FILE STATUS UPDATES IN TRANSACTION SYSTEMS

TECHNICAL FIELD

The present disclosure relates generally to transaction systems, and more particularly, although not exclusively, to proactive monitoring of file status updates in transaction systems.

BACKGROUND

Remote deposit capture (RDC) involves processing a digitized version of a scanned check or other transactional instrument. The digitized version is transmitted between multiple different electronic systems and layers to complete the associated transaction. Failures can occur when the digitized version is incorrectly processed, identified, or otherwise tracked. Thus, it may be advantageous to monitor transactions to determine when failures occur.

SUMMARY

According to one example of the present disclosure, a system can include a processor and a memory including instructions that are executable by the processor to perform operations. The operations can include sending an X9 file including transaction data associated with a plurality of transactions to a downstream transaction processing system. The operations can involve receiving, via an X9 file status application programming interface (API), a message indicating a status of the X9 file. The X9 file status API can receive the message from a listener system monitoring for X9 file status updates. The operations can further include causing an action based on the status of the X9 file.

According to another example of the present disclosure, a non-transitory computer readable medium may contain instructions that are executable by a processor to cause the processor to perform operations. The operations may include sending an X9 file including transaction data associated with a plurality of transactions to a downstream transaction processing system. The operations can involve receiving, via an X9 file status API, a message indicating a status of the X9 file. The X9 file status API can receive the message from a listener system monitoring for X9 file status updates. The operations can further include causing an action based on the status of the X9 file.

According to a further example of the present disclosure, a method involves sending an X9 file including transaction data associated with a plurality of transactions to a downstream transaction processing system. The method can also involve receiving, via an X9 file status API, a message indicating a status of the X9 file. The X9 file status API can receive the message from a listener system monitoring for X9 file status updates. The method can further include causing an action based on the status of the X9 file.

BRIEF DESCRIPTION OF THE DRAWINGS

FIG. 3 is a flowchart of a process for proactive monitoring of file status updates in transaction systems according to another example of the present disclosure.

DETAILED DESCRIPTION

An X9 file is a file in an X9 standard file format that is defined by the Accredited Standards Committee X9. An X9 file can include transaction data including information such as a transaction amount, a transaction date, a transaction recipient account, a transaction sender account, a routing number, and the like. A transaction gateway can generate an X9 file for a set of transactions and then send the X9 file to a downstream transaction system that processes the transactions. Conventionally, due to the large size of X9 files, transaction gateways may not monitor processing of the transactions and may only become aware of the processing if a user manually notifies the transaction gateway of the processing and any errors that occur. So, mitigating actions to resolve the errors are often delayed.

Aspects of the present disclosure provide a system that monitors processing of X9 files external to a transaction gateway so that mitigating actions may be performed automatically in response to the detection of an error associated with processing transactions. The system can include a transaction gateway that sends an X9 file with transaction data for a set of transactions (e.g., 30,000 transactions) to a downstream transaction processing system. As the downstream transaction processing system processes the X9 file, the downstream transaction processing system can provide a status update about the X9 file to a message queue. A listener system can pull the status update for the X9 file from the message queue and send a message indicating the status to the transaction gateway. The transaction gateway can then update a database with the status for each transaction in the X9 file. In addition, if the status indicates an error occurred during the processing of one or more transactions in the X9 file, the transaction gateway can cause an action, such as an output of a notification about the error.

Thus, an advantage of the system of the present disclosure is that the transaction gateway can automatically identify errors and trigger actions without user input. In addition, since the downstream transaction processing system provides the status updates to a message queue, and a listener system sends the status updates to the transaction gateway, the transaction gateway can perform the monitoring and associated actions with reduced processing power than would be needed if the transaction gateway determined the status updates itself.

The following illustrative examples are provided to introduce the reader to the general subject matter discussed herein, and are not intended to limit the scope of the disclosed concepts. In the following description, specific details are set forth in order to provide a thorough understanding of various implementations and examples. Various implementations may be practiced without these specific details. The figures and description are not intended to be restrictive.

Figure 1:
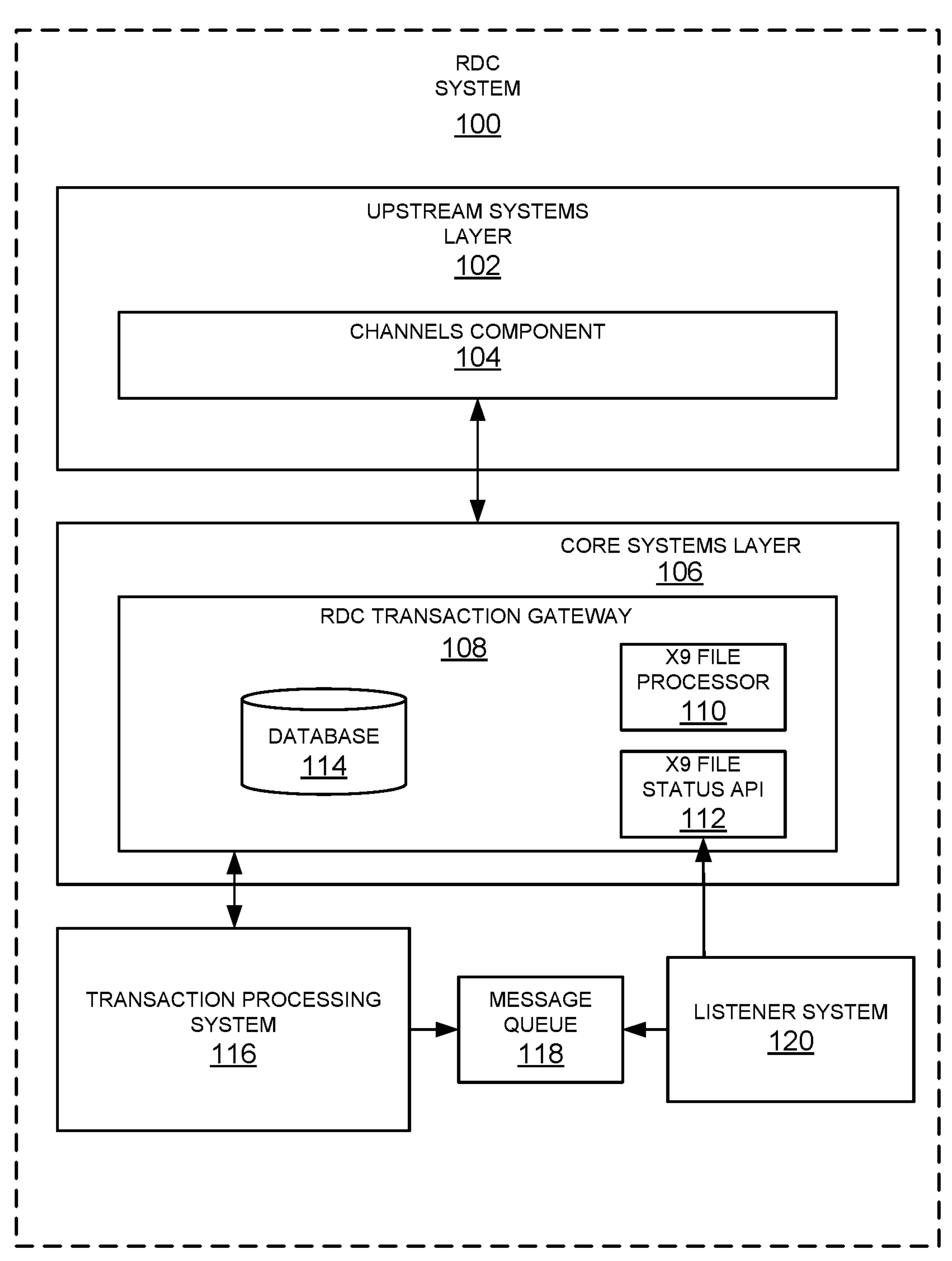
FIG. 1 is a schematic block diagram of a transaction gateway in communication with a listener system that can detect X9 file status updates according to an example of the present disclosure.

FIG. 1 is a schematic block diagram of a transaction gateway in communication with a listener system that can detect X9 file status updates according to an example of the present disclosure. In the example depicted in FIG. 1, the transaction gateway is part of a remote deposit capture (RDC) system 100 for receiving and processing RDC transactions. While the RDC system 100 is described in detail below for purposes of illustrating an example and its associated operation, the X9 file monitoring may also be used with other data capture system implementations and examples.

As represented in FIG. 1, the RDC system 100 may include an upstream systems layer 102. The upstream systems layer 102 may include a channels component 104, which may include multiple channels through which users can transmit digital check images and related non-image deposit data for subsequent processing and deposit. The channels may be, for example, cloud-based applications, mobile devices loaded with RDC applications, etc.

The upstream systems layer 102 may also include an orchestration component that resides downstream of the channels component 104 and facilitates subsequent downstream transmission of RDC transaction data in the form of digital (e.g., scanned) check images and related non-image deposit data such as, without limitation, various identifying information about the deposit and the depositor. For example, when a user initiates a RDC transaction using one of the upstream systems layer channels, the utilized channel may transmit the RDC transaction data to the orchestration component. In at least some examples, the orchestration component may store RDC transaction data in the form of log files.

The RDC system 100 example is also shown to include a core systems layer 106. The core systems layer may include a RDC transaction receiving component, which may be in the form of a frontend application configured to receive network-transmitted RDC transaction data from the orchestration component or another downstream component of the upstream systems layer 102. The core systems layer receiving component may perform various functions, such as but not limited to, digital check image assessment and balancing functions. The RDC transaction receiving component may store RDC transaction data in a receiving component database.

The core systems layer 106 may also include an RDC transaction gateway 108, which may receive RDC transaction data from the RDC receiving component and transmit said RDC transaction data downstream for further processing (e.g., check clearing, check depositing). More specifically, once the various processes performed by the RDC receiving component complete successfully, an X9 file processor 110 of the RDC transaction gateway 108 may generate an X9 batch file that contains both check image data and non-image deposit data associated with the RDC transactions transmitted from an upstream core systems layer component. The RDC transaction gateway 108 may store RDC transaction data in a database 114.

Once the X9 file is created by the X9 file processor 110, the X9 file may be transmitted to a downstream transaction processing system 116. The transaction processing system 116 processes the X9 files received from the core systems layer (e.g., the RDC transaction gateway 108) of the RDC system 100. The transaction processing system 116 may include multiple components for performing various operations such as, for example, analysis, clearing and deposit operations.

As the transaction processing system 116 processes the X9 file to complete the transactions, the transaction processing system 116 can provide status updates to a message queue 118. A status update may indicate which transactions of the transactions included in the X9 file have been completed and any errors that have occurred during the processing of the X9 file. The transaction processing system 116 may provide status updates at fixed time intervals (e.g., every minute) or after a certain event (e.g., completing processing of all of the transactions of an X9 file).

A listener system 120 can pull a status update for the X9 file from the message queue 118 and provide a message including the status update to the RDC transaction gateway 108 via an X9 file status API 112. The listener system 120 may transform the status update from the message queue 118 into an understandable message prior to sending the message to the RDC transaction gateway 108. The listener system 120 may periodically pull status updates, or the listener system 120 may be able to detect when a new status update has been sent to the message queue 118 and then pull the status update in response to the detection.

In some examples, the listener system 120 can perform a secure sockets layer (SSL) handshake with the X9 file status API 112 before sending the message to the RDC transaction gateway 108 via the X9 file status API 112 to provide privacy and data integrity for the transaction data. The SSL handshake may be a one-way SSL handshake or a two-way SSL handshake. If the SSL handshake is completed successfully, the listener system 120 can proceed with sending the message with the status update to the RDC transaction gateway 108 via the X9 file status API 112.

In some examples, the X9 file processor 110 can cause an action based on the status of the X9 file. For instance, the action may involve storing the status in a database 114. The status update may include a status for each transaction identified in the transaction data of the X9 file. So, an entry in the database 114 can be added or updated for each transaction based on the message.

Additionally or alternatively, if the status indicates that an error occurred for one or more of the transactions, the X9 file processor 110 can cause a notification indicating the error to be output. The error may be any issue associated with a transaction failing to be completed. Upon determining the status indicates the error, the X9 file processor 110 may generate the notification as an electronic mail message and send the electronic mail message for display at a user device. The electronic mail message may be sent to an account associated with a user of the user device, and the user can access the account to view the notification. Alternatively, the notification may be another alert or alarm that is presented at the user device.

In at least some examples, the RDC transaction gateway 108 may further include a dashboard that provides an authorized user with secure, role-based internal access to the database 114, at least for the purposes of investigating an error identified by the notification. To access the RDC transaction gateway 108, an authorized user may log in through a user interface of the RDC transaction gateway 108 by entering secure login credentials. Once the login credentials of the user are authenticated, the user may be provided with access to the database 114, where the user can view the status of each transaction, etc. The authorized user may also be able to view any RDC transaction information stored in the core systems layer of the RDC system (e.g., the RDC receiving component and the RDC transaction gateway 108 of the core systems layer 106).

By using the information available from a notification or incident ticket, and by accessing the RDC transaction gateway 108, an authorized user can investigate missing or other problem RDC transactions and troubleshoot and correct the problem (e.g., RDC system problem, network problem) that caused a given RDC transaction to have an error. To conserve memory resources, stored information associated with RDC transactions that are subsequently moved downstream and processed, may be deleted from the database 114.

Deletion of data stored in the RDC transaction gateway 108 may occur in real time, or may occur later, such as during a regularly scheduled (e.g., daily) database cleanup. In addition, since the processing of monitoring for status updates is performed by the listener system 120, which is external to the RDC transaction gateway 108, processing power of the RDC transaction gateway 108 can be reduced while still providing the functionality of automatic notification of errors.

Figure 2:
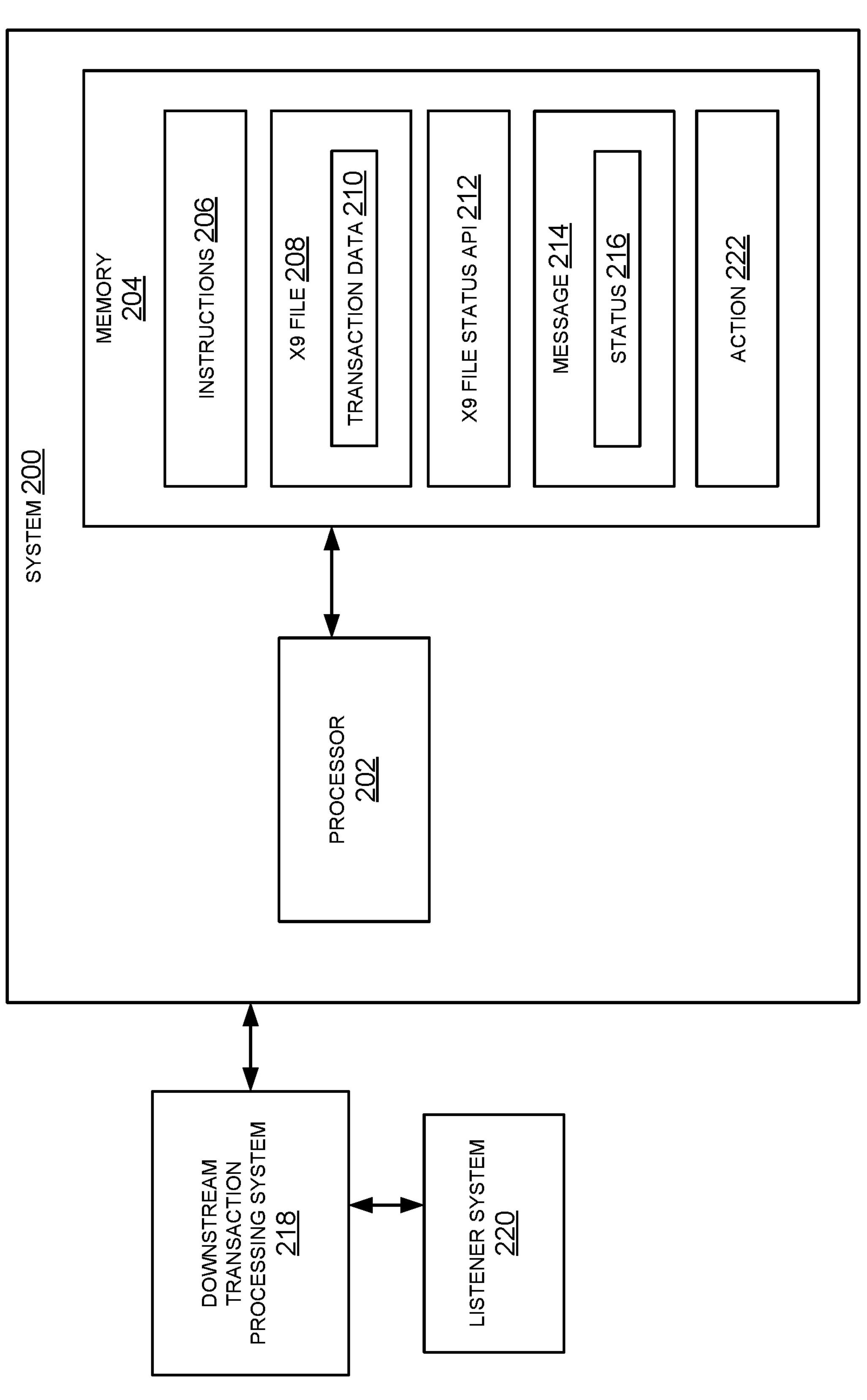
FIG. 2 is a block diagram of a system for proactive monitoring of file status updates in transaction systems according to one example of the present disclosure.

FIG. 2 is a block diagram of a system 200 for proactive monitoring of file status updates in transaction systems according to one example of the present disclosure. The system 200 may be the RDC transaction gateway 108 in FIG. 1. As depicted, the system 200 may include a processor 202 communicatively coupled to a memory 204. In some examples, the components shown in FIG. 2 can be integrated into a single structure. For example, the components can be within a single housing. In other examples, the components shown in FIG. 2 can be distributed (e.g., in separate housings) and in electrical communication with each other.

The processor 202 can execute one or more operations for implementing some examples. The processor 202 can execute instructions 206 stored in the memory 204 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can be a non-transitory, computer-readable medium from which the processor 202 can read the instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 202 can read the instructions 206.

The processor 202 can execute the instructions 206 to perform operations. For example, the processor 202 can send an X9 file 208 that includes transaction data 210 associated with a plurality of transactions to a downstream transaction processing system 218. Each transaction can be a remote deposit capture. The transaction data 210 can include deposit information such as a transaction amount, a transaction date, a transaction recipient account, a transaction sender account, a routing number, etc. In addition, the transaction data 210 can include a digital check image and non-image data associated with the remote deposit capture. The processor 202 can receive, via an X9 file status API 212, a message 214 indicating a status 216 of the X9 file 208. The X9 file status API 212 can receive the message 214 from a listener system 220 monitoring for X9 file status updates. The status 216 may indicate that some or all of the transactions have been completed, transactions currently being processed, and errors that have occurred for the transactions. The processor 202 can cause an action 222 based on the status 216 of the X9 file 208. For instance, if the status 216 indicates a transaction encountered an error, the processor 202 can generate and output a notification indicating the error.

FIG. 3 is a flowchart of a process for proactive monitoring of file status updates in transaction systems according to another example of the present disclosure. The process of FIG. 3 can be implemented by the RDC system 100 of FIG. 1 or the system 300 of FIG. 2, but other implementations are also possible.

At block 302, a processor 202 can send an X9 file 208 comprising transaction data 210 associated with a plurality of transactions to a downstream transaction processing system 218. The X9 file 208 may include the transaction data 210 for many transactions, such as 10,000 transactions, 20,000 transactions, 30,000 transactions, etc. The downstream transaction processing system 218 may process the X9 file 208 by performing analysis, clearing and other deposit operations.

At block 304, the processor 202 can receive, via an X9 file status API 212, a message 214 indicating a status 216 of the X9 file 208. The X9 file status API 212 can receive the message 214 from a listener system 220 monitoring for X9 file status updates. A status update may indicate which transactions of the transactions included in the X9 file 208 have been completed and any errors that have occurred during the processing of the X9 file 208. The listener system 220 may periodically pull status updates, or the listener system 220 may be able to detect when a new status update has been sent to a message queue and then pull the status update in response to the detection. In some examples, the listener system 220 can perform an SSL handshake with the X9 file status API 212 before sending the message 214 to the system 200 via the X9 file status API 212.

At block 306, the processor 202 can cause an action 222 based on the status 216 of the X9 file 208. For instance, the action 222 may involve storing the status 216 in a database. The status 216 may include a status for each transaction identified in the transaction data 210 of the X9 file 208. So, an entry in the database can be added or updated for each transaction based on the message 214. The X9 file status API 212 may perform another SSL handshake with the database prior to storing the status 216 in the database. In some examples, if the status 216 indicates that an error occurred for one or more of the transactions in the transaction data 210, the processor 202 can cause a notification indicating the error to be output. As an example, the processor 202 may generate the notification as an electronic mail message and send the electronic mail message for display at a user device. Or, the notification may be another alert or alarm that is presented at the user device. Thus, the processor 202 can automatically identify errors and trigger actions without user input. In addition, the system 200 can perform the monitoring and associated actions with reduced processing power than would be needed if the system 200 determined the status updates itself.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processor; and memory including instructions that are executable by the processor to cause the processor to:

send an X9 file comprising transaction data associated with a plurality of transactions to a downstream transaction processing system;

monitor, by a listener system external to a transaction gateway and the downstream transaction processing system, a message queue for status updates posted by the downstream transaction processing system in response to processing the X9 file, the listener system being configured to:

detect a new status update posted to the message queue;

retrieve the new status update in response to detecting the new status update;

prior to transmitting the new status update, initiate and complete a secure sockets layer (SSL) handshake with an X9 file status application programming interface (API) of the transaction gateway; and transmit the new status update to the X9 file status API upon completion of the SSL handshake;

receive, from the listening system and via the X9 file status API, a message indicating a status of the X9 file based on the new status update, the message comprising, for each transaction of the plurality of transactions, a transaction identifier, a processing status, and an error code; and store, in a database, the status for each transaction of the plurality of transactions in the X9 file based on the message, the status being usable for causing an action including triggering an automated remedial action by the transaction gateway in response to a detected error.

2. The system of claim 1, wherein the memory further includes instructions that are executable by the processor for causing the processor to cause the action by:

determining the status indicates an error in processing a transaction of the plurality of transactions; and causing a notification indicating the error to be output.

3. The system of claim 2, wherein the memory further includes instructions that are executable by the processor for causing the processor to cause the notification to be output by:

generating the notification as an electronic email message; and sending the electronic email message for display at a user device.

4. The system of claim 1, wherein a transaction of the plurality of transactions comprises a remote deposit capture and the transaction data includes a digital check image and non-image data associated with the remote deposit capture.

5. A non-transitory computer-readable medium comprising instructions that are executable by a processor for causing the processor to:

send an X9 file comprising transaction data associated with a plurality of transactions to a downstream transaction processing system;

monitor, by a listener system external to a transaction gateway and the downstream transaction processing system, a message queue for status updates posted by the downstream transaction processing system in response to processing the X9 file, the listener system being configured to:

detect a new status update posted to the message queue;

retrieve the new status update in response to detecting the new status update;

prior to transmitting the new status update, initiate and complete a secure sockets layer (SSL) handshake with an X9 file status application programming interface (API) of the transaction gateway; and transmit the new status update to the X9 file status API upon completion of the SSL handshake;

receive, from the listening system and via the X9 file status API, a message indicating a status of the X9 file based on the new status update, the message comprising, for each transaction of the plurality of transactions, a transaction identifier, a processing status, and an error code; and store, in a database, the status for each transaction of the plurality of transactions in the X9 file based on the message, the status being usable for causing an action including triggering an automated remedial action by the transaction gateway in response to a detected error.

6. The non-transitory computer-readable medium of claim 5, further comprising instructions that are executable by the processor for causing the processor to cause the action by:

determining the status indicates an error in processing a transaction of the plurality of transactions; and causing a notification indicating the error to be output.

7. The non-transitory computer-readable medium of claim 6, further comprising instructions that are executable by the processor for causing the processor to cause the notification to be output by:

generating the notification as an electronic email message; and sending the electronic email message for display at a user device.

8. The non-transitory computer-readable medium of claim 5, wherein a transaction of the plurality of transactions comprises a remote deposit capture and the transaction data includes a digital check image and non-image data associated with the remote deposit capture.

9. A method comprising:

sending an X9 file comprising transaction data associated with a plurality of transactions to a downstream transaction processing system;

monitoring, by a listener system external to a transaction gateway and the downstream transaction processing system, a message queue for status updates posted by the downstream transaction processing system in response to processing the X9 file, the listener system being configured to:

detect a new status update posted to the message queue;

retrieve the new status update in response to detecting the new status update;

prior to transmitting the new status update, initiate and complete a secure sockets layer (SSL) handshake with an X9 file status application programming interface (API) of the transaction gateway; and transmit the new status update to the X9 file status API upon completion of the SSL handshake;

receiving, from the listening system and via the X9 file status API, a message indicating a status of the X9 file based on the new status update, the message comprising, for each transaction of the plurality of transactions, a transaction identifier, a processing status, and an error code; and storing, in a database, the status for each transaction of the plurality of transactions in the X9 file based on the message, the status being usable for causing an action including triggering an automated remedial action by the transaction gateway in response to a detected error.

10. The method of claim 9, wherein the status of the X9 file includes the status associated with each transaction of the plurality of transactions.

11. The method of claim 9, wherein causing the action comprises:

determining the status indicates an error in processing a transaction of the plurality of transactions; and causing a notification indicating the error to be output.

12. The method of claim 9, wherein a transaction of the plurality of transactions comprises a remote deposit capture and the transaction data includes a digital check image and non-image data associated with the remote deposit capture.

13. The system of claim 1, wherein the memory further includes instructions that are executable by the processor for causing the processor to:

receive, via a user interface of a user device, a login of a user to a dashboard of the transaction gateway; and provide the user device access to the database and the transaction gateway in response to authenticating the login.

14. The system of claim 1, wherein the memory further includes instructions that are executable by the processor for causing the processor to:

receive the transaction data as log files from an orchestration component, the orchestration component having received the transaction data as digital check images and non-image deposit data from a channel;

perform digital check image assessment and balancing functions using the log files; and generate the X9 file based on the digital check image assessment and the balancing functions.

15. The system of claim 1, wherein the downstream transaction processing system is configured to post the new status update upon completing processing of each transaction of the plurality of transactions in the X9 file, wherein the SSL handshake is a first SSL handshake, and wherein the X9 file status API is configured to perform a second SSL handshake with the database prior to storing the status in the database.

* * * * *